E. L'Hommedieu,
Wood Auger.
Nº 627.    Patented Mar. 10, 1838.
Fig. 1
Fig. 2    Fig. 3
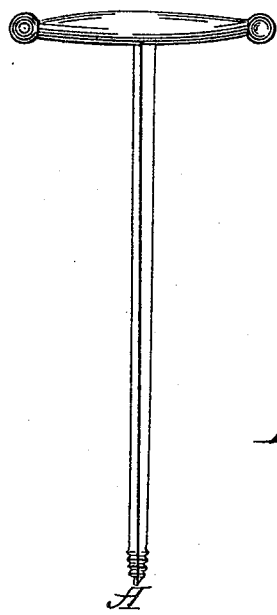

UNITED STATES PATENT OFFICE.

EZRA L'HOMMEDIEU, OF CHESTER, CONNECTICUT.

GIMLET.

Specification of Letters Patent No. 627, dated March 10, 1838.

*To all whom it may concern:*

Be it known that I, EZRA L'HOMMEDIEU, of Chester, in the county of Middlesex and State of Connecticut, have invented and applied to use a new and useful Improvement upon Orval Percival's Patent (of East Haddam, Connecticut) for Making Gimlets, represented at Figure 2, viz:

After the pod of the gimlet is made and the screw is cut on the back of it, on the left of the center at the point of the screw take out a semicircular piece A, Figs. 1 and 3, the depth of one screw or more which makes a sharp point and causes the screw to enter readily and hold on while it is in the wood.

This I claim to be my invention and of great importance as an improvement on said Percival's patent gimlet.

In testimony that the above is a true specification of my said improvement as above described I have hereunto set my hand this 3d day of January, in the year of our Lord 1838.

EZRA L'HOMMEDIEU. [L. S.]

Witnesses:
JOHN G. BUTLER,
THADDEUS BEACH.